April 28, 1925.
I. ISAACHSEN
1,535,531
HEAT TRANSMISSION TUBE
Filed Sept. 28, 1920
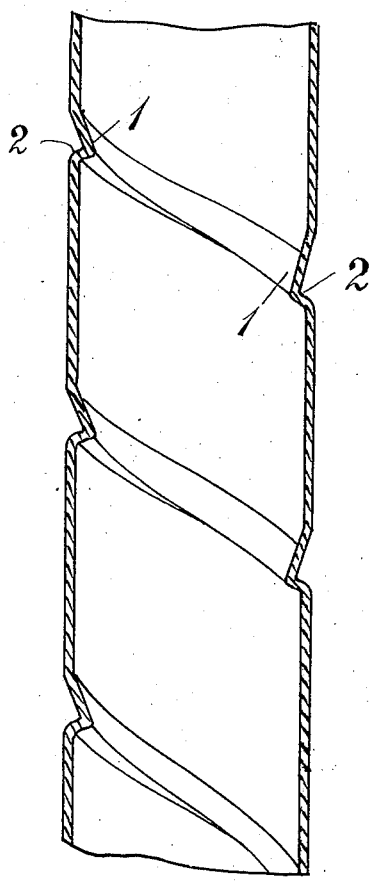
Inventor:
Isak Isaachsen,
by Byrne Townsend & Brickenstein,
Attys.

Patented Apr. 28, 1925.

1,535,531

UNITED STATES PATENT OFFICE.

ISAK ISAACHSEN, OF CHRISTIANIA, NORWAY, ASSIGNOR, BY MESNE ASSIGNMENTS, TO A/S KRYSTAL, OF CHRISTIANIA, NORWAY.

HEAT-TRANSMISSION TUBE.

Application filed September 28, 1920. Serial No. 413,383.

*To all whom it may concern:*

Be it known that I, ISAK ISAACHSEN, a subject of the King of Norway, residing at Christiania, Norway, have invented certain new and useful Improvements in Heat-Transmission Tubes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to vertical heat transmission or condensing tubes and the object of the invention is to provide a tube of this kind which will give an effective heat transmission and which is liable to keep the liquid inside the tube in continuous contact with the tube walls, while at the same time being adapted to keep the largest possible part of the exterior tube surface free from condensed steam, which is otherwise liable to accumulate as an insulating film covering the exterior surface of the tube.

This object is obtained according to the present invention by providing the exterior surface of the tubes with shallow helical grooves, said grooves forming on the inside of the tubes helical ribs adapted to impart a rotary movement to the water flowing along the inside of the tube.

The helical rib or ribs according to the present invention are so formed as to allow the water to pass across the same without difficulty serving only as means for giving the water a slightly helical movement and not being liable to conduct the flow of water or part of the same along the ribs.

This is a point of considerable importance as in the latter case the passage of the water along the inside of the tube will be limited to a helical path along the upper side of the rib, while the space below the rib or ribs will be kept free from water, whereby this part of the tube does not take part in the transmission of the heat from outside to inside and the efficiency of the tube is decreased.

On the other hand the rotary movement imparted to the water by the helical ribs is very important for keeping the water in good contact with the tube walls by means of centrifugal force.

The grooves in the exterior surface of the condensing tube serve the purpose of collecting the condensed steam accumulating on the exterior surface of the tube and conducting the condensate along the tube in the said helical groove instead of allowing it to spread over the whole tube surface covering the same with an insulating film of water.

On the drawing is illustrated a form of the invention by means of an axial sectional view through part of a steam condensing tube.

As it is seen the exterior tube surface is provided with a helical groove 2 forming a helical rib 1 on the inside of the tube. As will be noted the upper surface of the helical rib 1 is very steep thus forming little resistance to the water flowing along the inside of the tube wall. The bottom of the groove 2 however is substantially horizontal so as to be able to serve as a channel for the water on the exterior tube surface.

Owing to the surface tension of the water the same will however be liable to follow the groove 2 instead of spreading over the whole tube surface even if the said groove is very shallow.

Instead of providing a groove in the exterior tube surface the groove may be on the inside and the rib on the outside, as this will produce practically the same effects.

Claim.

In apparatus for transmitting heat to a liquid flowing down the inside of a tube from vapor on the outside of the tube, a substantially vertical tube having in one of its surfaces a shallow helical groove forming on the opposite side a correspondingly low rib, the groove and the rib being so formed that the liquid to be heated passes down the inside surface in the form of a continuous film undergoing rotary movement and that the condensed vapor collecting on the outside surface will follow the helical path defined by the groove or rib, respectively.

In testimony that I claim the foregoing as my invention, I have signed my name in presence of two subscribing witnesses.

ISAK ISAACHSEN.

Witnesses:
A. B. COOK,
EDITH SKAUGEN.